(12) United States Patent
Nakahara et al.

(10) Patent No.: US 10,177,603 B2
(45) Date of Patent: Jan. 8, 2019

(54) COIL UNIT AND POWER SUPPLY SYSTEM INCLUDING THE SAME

(71) Applicant: Yazaki Corporation, Tokyo (JP)

(72) Inventors: Takahiro Nakahara, Susono (JP); Ryohei Nishizaki, Susono (JP); You Yanagida, Susono (JP)

(73) Assignee: Yazaki Corporation, Tokyo (JP)

( * ) Notice: Subject to any disclaimer, the term of this patent is extended or adjusted under 35 U.S.C. 154(b) by 235 days.

(21) Appl. No.: 15/232,146

(22) Filed: Aug. 9, 2016

(65) Prior Publication Data

US 2016/0352153 A1 Dec. 1, 2016

Related U.S. Application Data

(63) Continuation of application No. PCT/JP2015/053223, filed on Feb. 5, 2015.

(30) Foreign Application Priority Data

Feb. 14, 2014 (JP) ................................ 2014-026290

(51) Int. Cl.
*H01F 37/00* (2006.01)
*H01F 38/00* (2006.01)
*H01F 27/42* (2006.01)
*H02J 50/12* (2016.01)
*H02J 7/02* (2016.01)
(Continued)

(52) U.S. Cl.
CPC ............ *H02J 50/12* (2016.02); *B60L 11/182* (2013.01); *H02J 7/0042* (2013.01); *H02J 7/025* (2013.01); *H02J 17/00* (2013.01); *H02J 50/70* (2016.02); *B60L 2230/10* (2013.01); *B60L 2270/147* (2013.01); *H01F 38/14* (2013.01); *H01F 2027/348* (2013.01); *Y02T 10/7005* (2013.01);
(Continued)

(58) Field of Classification Search
CPC ............... B60L 11/182; B60L 2230/10; B60L 2270/147; H02J 17/00; H02J 50/12; H02J 50/70; H02J 7/0042; H02J 7/025; H01F 2027/348; H01F 38/14; Y02T 10/7005; Y02T 10/7088; Y02T 90/12; Y02T 90/122; Y02T 90/14
USPC ........................................................ 307/104
See application file for complete search history.

(56) References Cited

U.S. PATENT DOCUMENTS 9,787,138 B2    10/2017   Ichikawa

FOREIGN PATENT DOCUMENTS

JP    2004-228444 A    8/2004
JP    2012-186909 A    9/2012
(Continued)

OTHER PUBLICATIONS

Office Action dated Mar. 6, 2018, issued for the Japanese patent application No. 2014-026290 and English translation thereof.
(Continued)

*Primary Examiner* — Rexford Barnie
*Assistant Examiner* — Toan Vu
(74) *Attorney, Agent, or Firm* — Locke Lord LLP

(57) ABSTRACT

A power-supply-side and the power-receiving-side units include power-supply-side and power-receiving-side coils each of which supplies or receives power in a non-contact manner; and a ceramic capacitor provided with an electrode being housed inside power-supply-side and power-receiving-side cases. The ceramic capacitor is arranged such that the electrode is non-perpendicular to each center axis direc-
(Continued)

EMBODIMENT tion of the power-supply-side and power-receiving-side coils.

2 Claims, 5 Drawing Sheets

(51) Int. Cl.
*H02J 50/70* (2016.01)
*H02J 17/00* (2006.01)
*B60L 11/18* (2006.01)
*H02J 7/00* (2006.01)
*H01F 38/14* (2006.01)
*H01F 27/34* (2006.01)

(52) U.S. Cl.
CPC ............ *Y02T 10/7088* (2013.01); *Y02T 90/12* (2013.01); *Y02T 90/122* (2013.01); *Y02T 90/14* (2013.01)

(56) References Cited

FOREIGN PATENT DOCUMENTS

| | | |
|---|---|---|
| JP | 2013-165576 A | 8/2013 |
| JP | 2013-172503 A | 9/2013 |
| WO | 2013/183105 A1 | 12/2013 |

OTHER PUBLICATIONS

International Search Report dated Mar. 24, 2015, issued for PCT/JP2015/053223.

EMBODIMENT

COMPARATIVE EXAMPLE

COIL UNIT AND POWER SUPPLY SYSTEM INCLUDING THE SAME

CROSS REFERENCE TO RELATED APPLICATIONS

This application is related to two co-pending applications: "COIL UNIT AND POWER SUPPLY SYSTEM" filed even date herewith in the names of Takahiro Nakahara, Ryohei Nishizaki and You Yanagida as a national phase entry of PCT/JP2015/051479; and "POWER RECEIVING UNIT AND POWER SUPPLY SYSTEM HAVING THE SAME" filed even date herewith in the names of Takahiro Nakahara, Ryohei Nishizaki and You Yanagida as a national phase entry of PCT/JP2015/051478; which applications are assigned to the assignee of the present application and all three incorporated by reference herein.

TECHNICAL FIELD

The present invention relates to a coil unit that receives or supplies power in a non-contact manner and a power supply system including the coil unit.

BACKGROUND ART

Recently, wireless (non-contact) power transmission techniques, which do not require physical connection such as plug connection, have been used in order to make charging work easy when charging a secondary battery (hereinafter, simply referred to as a "motive power battery") provided in, for example, a plug-in hybrid car (PHEV), an electric car (EV) and the like.

For example, in a power supply system disclosed in Patent Literature 1, one of a pair of coils electromagnetically resonate with each other is installed on a ground surface of a supply equipment. The other one is mounted to a vehicle such that power is supplied in a non-contact manner from the coil installed on the ground surface of the power supply equipment to the coil mounted to the vehicle.

In general, the coil is housed inside a case together with various types of parts such as a capacitor, configured to adjust a resonant frequency, in order to acquire reduction in size. However, the conventional power supply system has a problem that temperature inside the case rises so that power transmission efficiency decreases due to an increase in resistance value of the coil or the temperature exceeds an upper limit value of use temperature of the capacitor.

Thus, it is considered countermeasures to lower a power output by providing the capacitor away from the coil or adding a heat dissipation member in order to solve the above-described problem, but such countermeasures cause a new problem that charging time is extended due to an increase in size, an increase in weight, and reduction in transmitted power.

CITATION LIST

Patent Literature

Patent Literature 1: JP 2012-186909 A

SUMMARY OF INVENTION

Technical Problem

Thus, the present invention is to provide a coil unit that is capable of suppressing a temperature rise inside a case and a power supply system including the same.

Solution to Problem

The inventors have conducted intensive studies regarding a cause of the temperature rise. As a result, the inventors found out that the temperature rises due to an eddy current, which is generated on a metal surface, for example, an electrode of a capacitor or the like housed inside the case due to a magnetic field generated from the coil, and derived the present invention.

That is, the present invention includes a coil that supplies or receives power in a non-contact manner; a plurality of capacitors that is provided with an electrode being a metal surface; and a case that houses the coil and the part. Each of the capacitors is arranged such that the electrode is non-perpendicular to a center axis direction of the coil.

Furthermore, in the present invention, a plurality of the capacitors are arranged side by side along the center axis direction of the coil and obliquely arranged such that the electrodes of the capacitors are away from the coil as approaching a center in the center axis direction of the coil. The plurality of capacitors are arranged such that the capacitor which is closer to the center in the center axis direction of the coil has smaller inclination with respect to the center axis direction.

Further, a power supply system of the present invention includes a power supply unit that is provided on a ground surface; and a power receiving unit that is provided in a vehicle. The power receiving unit receives power transmitted from the power supply unit in a non-contact manner. At least one of the power supply unit or the power receiving unit includes the coil unit described above.

Advantageous Effects of Invention

As described above, according to the present invention, the electrode being the metal surface of the capacitor is arranged with non-perpendicular to the center axis of the coil. Thus, a magnetic flux is scarcely perpendicular to the metal surface, and it is possible to suppress the generation of eddy current on the electrode of the capacitor and to suppress the temperature rise of capacitor.

According to the present invention, it is possible to suppress the generation of the eddy current in the electrode of the capacitor, and to suppress the temperature rise of the capacitor.

According to the present invention, it is possible to more reliably suppress the generation of the eddy current in the electrode of the capacitor, and to suppress the temperature rise of the capacitor.

DESCRIPTION OF EMBODIMENTS

Hereinafter, a power supply system according to an embodiment of the present invention will be described with reference to FIGS. 1 to 5.

Figure 1:
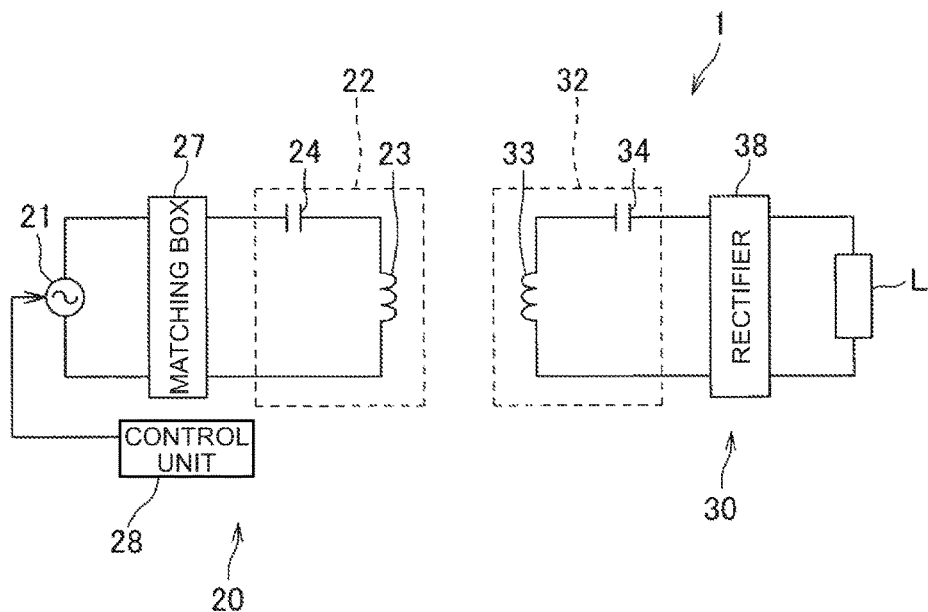
FIG. 1 is a diagram illustrating a schematic configuration of a power supply system of an embodiment of the present invention.
Figure 2:
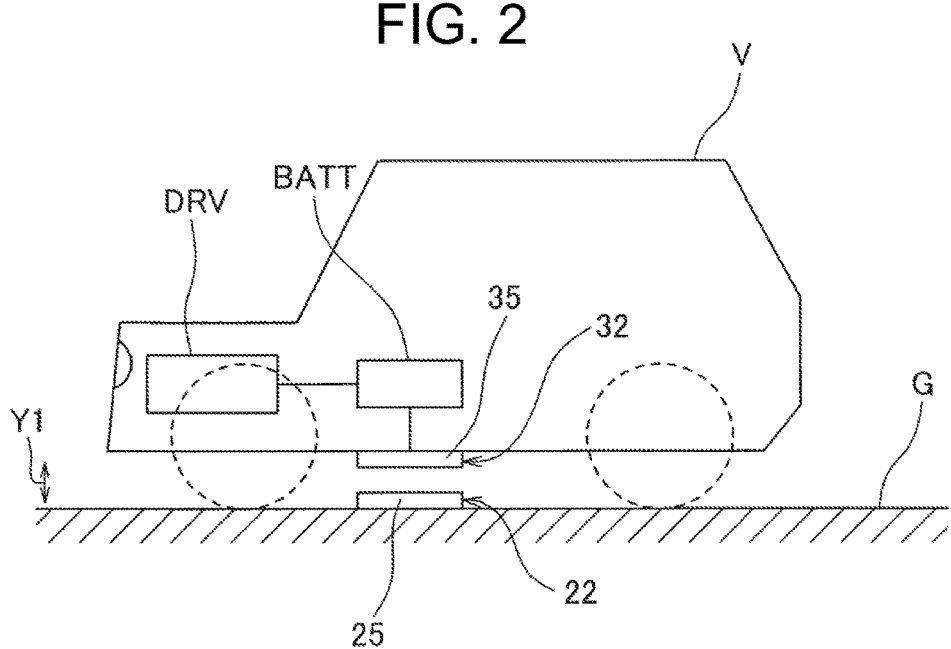
FIG. 2 is a diagram describing arrangement of a power supply unit and a power receiving unit provided in the power supply system of FIG. 1.
Figure 3:
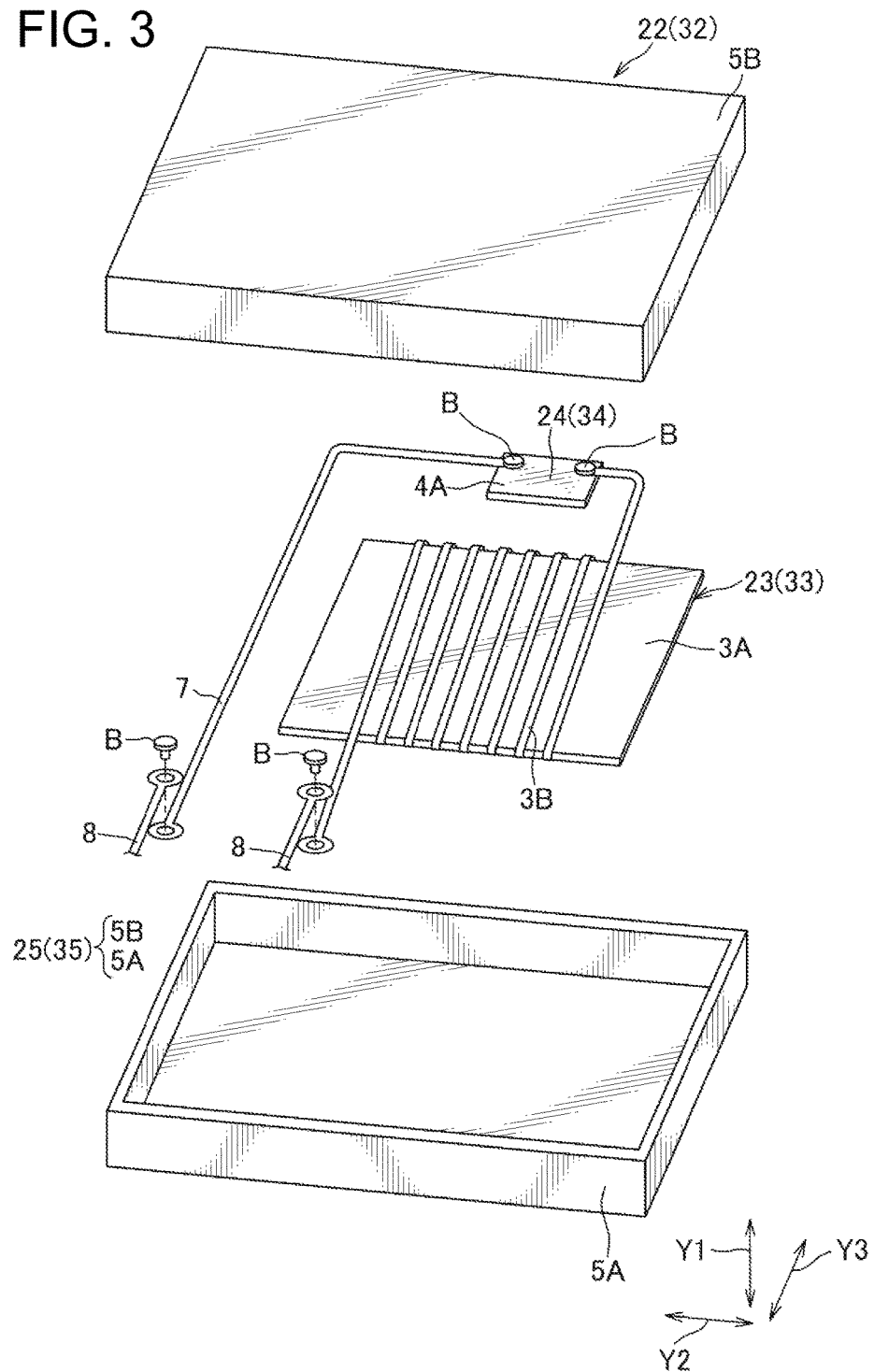
FIG. 3 is a schematic exploded perspective view of the power supply unit and the power receiving unit of FIG. 2.
Figure 4:
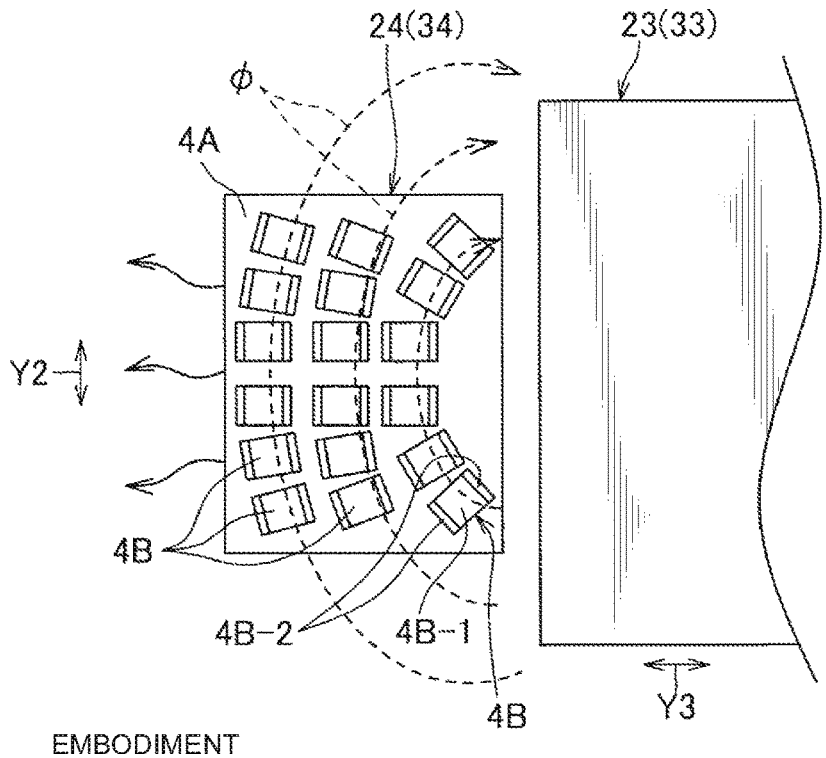
FIG. 4 is a top view of a capacitor body and a coil illustrated in FIG. 2.
Figure 5:
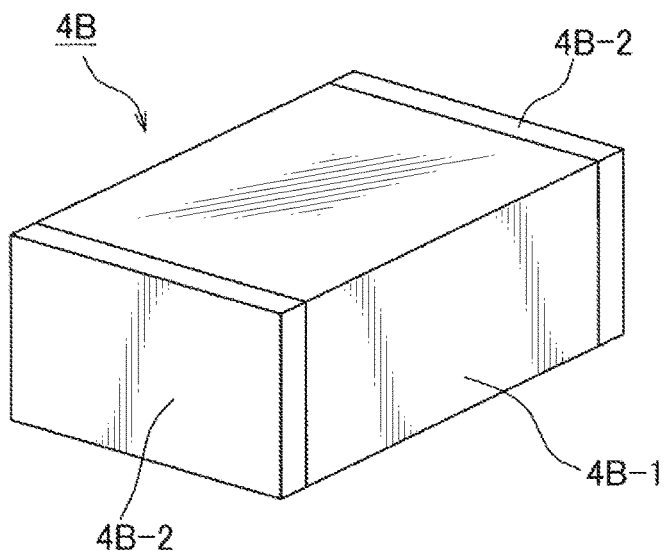
FIG. 5 is a perspective view of the capacitor illustrated in FIG. 2.

FIG. 1 is a diagram illustrating a schematic configuration of a power supply system of an embodiment of the present invention. FIG. 2 is a diagram describing arrangement of a power supply unit and a power receiving unit provided in the power supply system of FIG. 1. FIG. 3 is an exploded perspective view of the power supply unit and the power receiving unit of FIG. 2. Incidentally, reference signs of parts configuring the power receiving unit are described inside parentheses in FIG. 3. FIG. 4 is a top view of a capacitor body and a coil illustrated in FIG. 2. FIG. 5 is a perspective view of the capacitor illustrated in FIG. 2.

The power supply system of the present embodiment supplies power from a ground surface side to a vehicle in a non-contact manner using a magnetic field resonance scheme. Incidentally, another scheme may be used instead of the magnetic field resonance scheme as long as power is transmitted by electromagnetically coupling a power-supply side and a power-receiving side.

First, a general configuration of a power supply system 1 will be described. As illustrated in FIG. 1, the power supply system 1 includes a power supply device 20, which is arranged on a ground surface G (illustrated in FIG. 2) and serves as the power supply unit, and power receiving device 30, which is arranged in a vehicle V (illustrated in FIG. 2) and serves as the power receiving unit. As illustrated in FIG. 2, the vehicle V includes a drive unit DRV, which includes an engine and a motor, and a motive power battery BATT which supplies power to the motor.

As illustrated in FIG. 1, the power supply device 20 includes a high-frequency power source 21, a power supply unit 22 serving as a coil unit, a matching box 27, and a control unit 28.

The high-frequency power source 21 generates a high-frequency power from, for example, a commercial power source and supplies the generated power to the power supply unit 22 to be described later. The high-frequency power generated by the high-frequency power source 21 is set to a frequency equal to a resonant frequency of the power supply unit 22 and a resonant frequency of a power receiving unit 32 to be described later.

As shown in FIGS. 2 and 3, the power supply unit 22 includes a power-supply-side coil 23 serving as a coil, a power-supply-side capacitor body 24, and a power-supply-side case 25 serving as a box-like case to house the both. As shown in FIG. 2, the power supply unit 22 is installed on the ground surface G. The power supply unit 22 may be buried in the ground surface G.

The power-supply-side coil 23 and the power-supply-side capacitor body 24 are connected to each other in series and form a resonant circuit that resonates at a predetermined resonant frequency. The power-supply-side coil 23 and the power-supply-side capacitor body 24 are connected in series in the present embodiment, but may be connected in parallel.

The matching box 27 is a circuit which is configured to match an impedance between the high-frequency power source 21 and the resonant circuit formed of the power-supply-side coil 23 and the power-supply-side capacitor body 24.

The control unit 28 is configured using a well-known microcomputer or the like including a ROM, a RAM, a CPU and the like, and is responsible for the entire control of the power supply device 20. The control unit 28 performs on/off control of the high-frequency power source 21 according to a request of power transmission, for example.

The power receiving device 30 includes the power receiving unit 32 serving as the coil unit and a rectifier 38.

As illustrated in FIGS. 2 and 3, the power receiving unit 32 includes a power-receiving-side coil 33 serving as the coil, a power-receiving-side capacitor body 34, and a power-receiving-side case 35 serving as a box-like case to house the both. As illustrated in FIG. 2, the power receiving unit 32 is attached to a lower surface of the vehicle V.

The power-receiving-side coil 33 and the power-receiving-side capacitor body 34 are connected to each other in series and form a resonant circuit that resonates at the same resonant frequency as the power supply unit 22. The power-receiving-side coil 33 and the power-receiving-side capacitor body 34 are connected in series in the present embodiment, but may be connected in parallel.

The rectifier 38 converts the high-frequency power received by the power receiving unit 32 into a direct current power. For example, the rectifier 38 is connected with a load L such as a charging unit to be used for charging of the motive power battery BATT which is mounted to the vehicle V.

In the above-described power supply system 1, the control unit 28 turns on the high-frequency power source 21 to generate the high-frequency power when a request for power transmission to the vehicle V is generated as a charging operation of the motive power battery BATT of the parked vehicle V is input in the power supply facility. Further, when the high-frequency power is supplied to the power supply unit 22, the power supply unit 22 and the power receiving unit 32 performs magnetic field resonance so that the high-frequency power is transmitted from the power supply unit 22, and the power receiving unit 32 receives the high-frequency power. The high-frequency power received by the power receiving unit 32 is converted into a direct current power by the rectifier 38, and then, supplied to a charging unit of the vehicle V, and the motive power battery BATT is charged by the charging unit.

Next, detailed configurations of the power supply unit 22 and the power receiving unit 32, which have been schematically described, will be described with reference to FIG. 3 and the like. The power supply and power receiving units 22 and 32, respectively, include the power-supply-side and power-receiving-side coils 23 and 33, the power-supply-side and power-receiving-side capacitor bodies 24 and 34, and the power-supply-side and power-receiving-side cases 25 and 35 as described above.

As illustrated in FIG. 3, each of the power-supply-side and power-receiving-side coils 23 and 33 includes a core 3A, which has a rectangular plate shape, and made of, for example, ferrite, and a coil wire 3B obtained by braiding a litz wire wound around the core 3A like a coil.

The cores 3A of the power-supply-side and power-receiving-side coils 23 and 33 are horizontally arranged inside the power-supply-side and power-receiving-side cases 25 and 35 to be described later. The coil wire 3B is wound around the core 3A having a direction, which is orthogonal to a separation direction (vertical direction Y1 in the present embodiment) of the power supply unit 22 and the power receiving unit 32 as the center axis thereof. As illustrated in FIG. 2, these power-supply-side and power-receiving-side coils 23 and 33 are arranged such that the cores 3A oppose each other in the vertical direction Y1, and center axis directions Y2 of the coil wires 3 are parallel to each other when the vehicle V is parked at a predetermined power supply position.

As shown in FIG. 4, each of the power-supply-side and power-receiving-side capacitor bodies 24 and 34 includes a circuit board 4A which has a rectangular plate shape and is obtained by forming a wiring pattern on a surface of a glass epoxy substrate, and a plurality of ceramic capacitors 4B serving as parts or capacitors mounted to the circuit board 4A. As shown in FIG. 3, a terminal fitting, which is attached to one end of the coil wire 3B, is fastened to the circuit board 4A by a bolt B. Accordingly, the coil wire 3B and the ceramic capacitor 4B are electrically connected to each other. In addition, a terminal fitting, which is attached to one end of a lead-out wire 7 formed using a litz wire, is fastened to the circuit board 4A by the bolt B. The other end of the coil wire 3B and the other end of the lead-out wire 7 are fastened to terminals of a pair of lead wires 8 which are lead out and routed from an inner side to an outer side of the power-supply-side and power-receiving-side cases 25 and 35, to be described later, by the bolt B.

In addition, the circuit board 4A and the core 3A are horizontally arranged side by side along a width direction Y3 of the core 3A (that is, a direction orthogonal to both the vertical direction Y1 and the center axis direction Y2). In addition, the circuit board 4A is arranged at the center of the coil wire 3B in the center axis direction Y2.

Each of the power-supply-side and power-receiving-side cases 25 and 35 is configured to be dividable into a main body portion 5A provided with an opening and a lid portion 5B which covers the opening of the main body portion 5A. The main body portion 5A is configured using a material which allows magnetism from the power supply device 20 to pass therethrough, for example, fiber-reinforced plastic (FRP) or the like. The lid portion 5B is configured using a material which prevents the magnetism from passing therethrough (serves as a magnetic shield), for example, aluminum or an alloy. Each of the power-supply-side and power-receiving-side cases 25 and 35 forms a space in which the power-supply-side and power-receiving-side coils 23 and 33, and the power-supply-side and power-receiving-side capacitor bodies 24 and 34 are housed when the main body portion 5A and the lid portion 5B are combined and fixed by a fixing means such as a screw (not illustrated). In addition, the power-supply-side case 25 is arranged on the ground surface G such that the lid portion 5B is on the ground surface G side, and the main body portion 5A is on the vehicle V side. The power-receiving-side case 35 is attached to a lower surface of the vehicle V such that the lid portion 5B is on the lower surface side of the vehicle V, and the main body portion 5A is on the ground surface G side.

Next, the array of the ceramic capacitor 4B on the circuit board 4A will be described. As illustrated in FIG. 5, the ceramic capacitor 4B is configured of a capacitor main body portion 4B-1 having a cube shape and electrodes 4B-2 which serve as metal surfaces, respectively, provided on a pair of side surfaces of the capacitor main body portion 4B-1 opposing each other. The electrode 4B-2 is provided on the entire side surface of the capacitor main body portion 4B-1 and has a certain extent of area.

As shown in FIG. 4, the plurality of ceramic capacitors 4B are arranged side by side on the circuit board 4A. When the plurality of ceramic capacitors 4B are arranged on the circuit board 4A in this manner, generally, it is common that the electrodes 4B-2 are arranged side by side in a straight line to be orthogonal to the center axis direction Y2 as shown in FIG. 6 in order to arrange the ceramic capacitors 4B without any gap therebetween and to reduce an area of the circuit board 4A.

Figure 6:
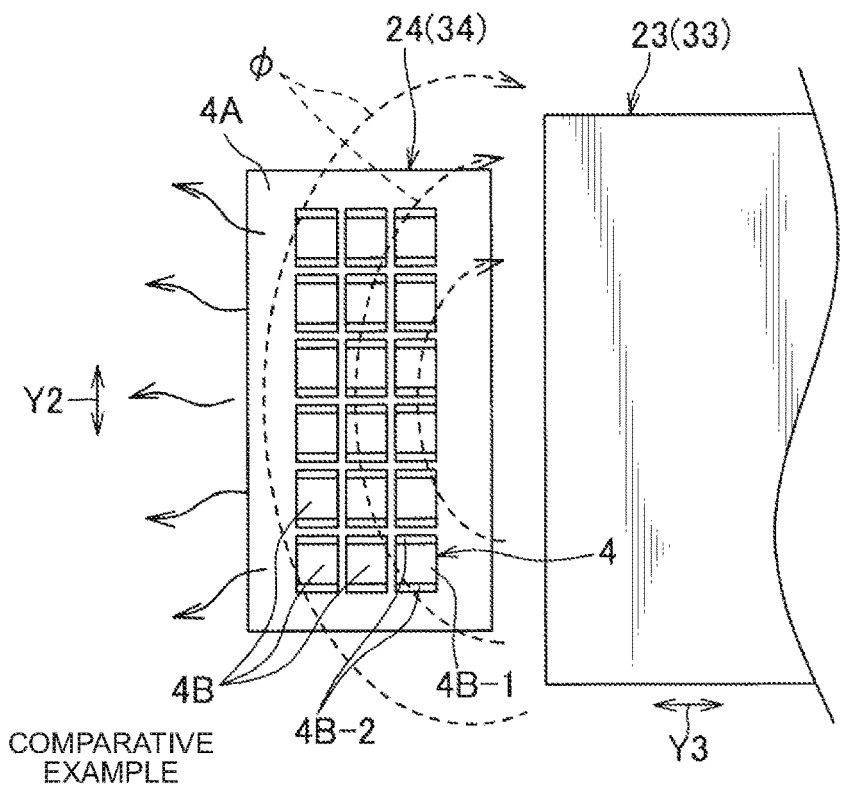
FIG. 6 is a top view of a capacitor body and a coil according to a comparative example.
Figure 7:
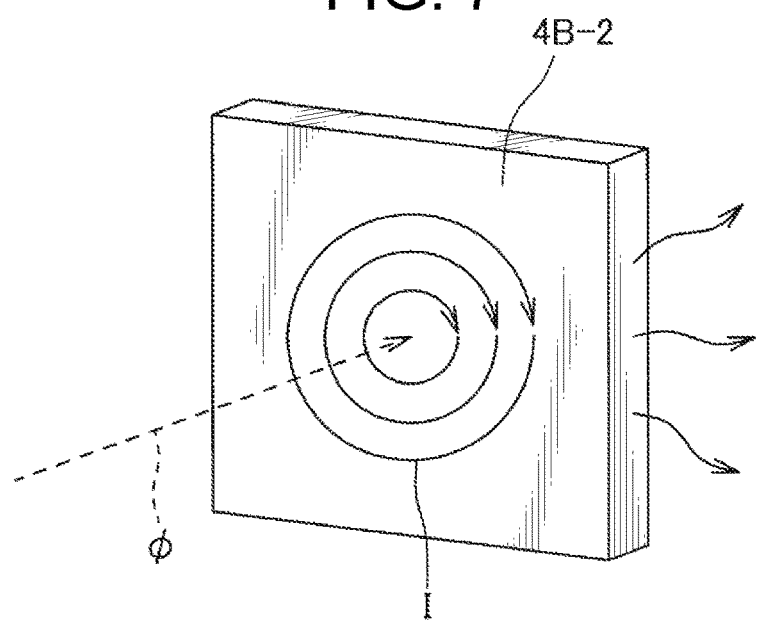
FIG. 7 is a diagram for describing an eddy current generated in an electrode of the capacitor.

However, there is a risk that the temperature of the ceramic capacitor 4B rises to exceed the upper limit value of the use temperature in the arrangement as illustrated in FIG. 6. The inventors have conducted intensive studies regarding a cause of the temperature rise, and found out that magnetic fluxes φ are generated from one end toward the other end in the center axis direction Y1 of each of the coils 23 and 33 as illustrated using dotted lines of FIG. 6. Thus, when the ceramic capacitors 4B are arranged such that the electrodes 4B-2 are orthogonal to the center axis direction Y2 as illustrated in FIG. 6, the magnetic fluxes φ, which are perpendicular to the electrodes 4B-2 of the ceramic capacitors 4B increase as illustrated in FIG. 7, an eddy current I generated in the electrode 4B-2 increases, and thereby the temperature rises.

Thus, the ceramic capacitors 4B are arranged in the present embodiment such that the electrodes 4B-2 thereof are non-perpendicular to the center axis direction Y2, that is, the electrodes 4B-2 are oblique or parallel to the center axis direction Y2 as illustrated in FIG. 4. To be specific, the plurality of ceramic capacitors 4B are arranged along the center axis direction Y2 of the coils 23 and 33. The ceramic capacitors 4B are arranged side by side in three columns along the center axis direction Y2 in the present embodiment. The six ceramic capacitors 4B are arranged side by side in each column.

The ceramic capacitors 4B, which are arranged near the center in the center axis direction Y2 of each of the coils 23 and 33, are arranged such that the electrodes 4B-2 thereof are parallel to the center axis direction Y2. Each of others of the ceramic capacitors 4B is obliquely arranged such that the electrode 4B-2 thereof is away from each of the coils 23 and 33 as approaching each center in the center axis direction Y2 of the coils 23 and 33.

In addition, others of the plurality of ceramic capacitors 4B are arranged such that the capacitor which is closer to each center of the coils 23 and 33 in the center axis direction Y2 has smaller inclination with respect to the center axis direction Y2. In addition, the other plurality of ceramic capacitors 4B are arranged to have smaller inclination with respect to the center axis direction Y2 as being away from the coils 23 and 33.

Figure 8:
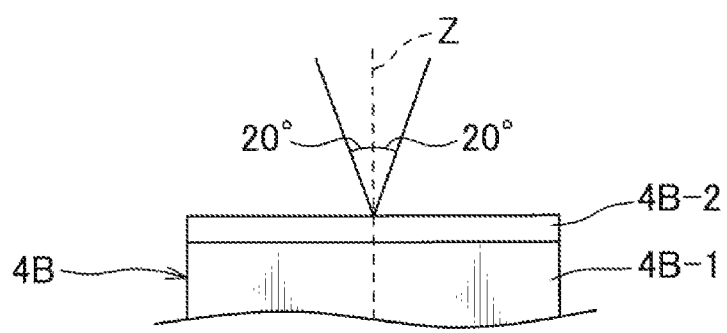
FIG. 8 is a diagram for describing a relation between the electrode of the capacitor and a magnetic flux.

When arranged in this manner, the magnetic flux φ is oblique or parallel to each of the electrodes 4B-2 of the ceramic capacitors 4B. Thus, the magnetic flux φ is scarcely perpendicular to the electrode 4B-2, and it is possible to suppress the generation of the eddy current I in the electrode 4B-2. It is desirable to prevent the magnetic flux φ from being within ±20° with respect to an axis Z, which is orthogonal to the electrode 4B-2 as illustrated in FIG. 8, in order to suppress the generation of the eddy current I.

According to the above-described embodiment, changes in temperature characteristics of the ceramic capacitor 4B or the coils 23 and 33 decrease, and it is unnecessary to provide a circuit to correct the temperature characteristic, and the reduction in size is possible. In addition, it is possible to provide the power supply and power receiving units 22 and 32 that are hardly broken by heat, and to reduce the maintenance frequency after installation, and thus, it is possible to make the burden of user light. In addition, it is possible to reduce the temperature rise and reduce the size and thickness even when the capacitor bodies 24 and 34 are away from the coils 23 and 33 or a heat dissipation material is added, and thus, it is possible to achieve reduction in weight at the time of being mounted to the vehicle.

In addition, the ceramic capacitors 4B are arranged side by side on both an upper surface and the lower surface of the circuit board 4A, and the ceramic capacitors 4B arranged on each of the upper surface and the lower surface are electrically connected through through-holes in order to achieve the reduction in size of the circuit board 4A in the present embodiment. Thus, there is a risk that the eddy current is generated in a metal material filled in the through-holes due to the magnetic fluxes φ from the coils 23 and 33. Thus, the number of the through-holes are decreased as much as possible, thereby forming a shape with a high heat dissipation property in the present embodiment.

Incidentally, the ceramic capacitor 4B is provided as the part according to the above-described embodiment, but the invention is not limited thereto. In addition to this, for example, it is considered a circuit board or the like in which a conductive pattern (metal surface) is formed, and it is considered to arrange the circuit board such that the conductive pattern is non-perpendicular to in the center axis direction Y2.

In addition, the plurality of ceramic capacitors 4B arranged on the circuit board 4A are arranged as shown in FIG. 4 according to the above-described embodiment, but the invention is not limited thereto. It is desirable to predict a direction of the magnetic flux φ from positions of the capacitor bodies 24 and 34 with respect to the coils 23 and 33, and to provide the circuit board 4A such that the electrode 4B-2 is parallel to the magnetic flux φ as much as possible.

In addition, the electrodes 4B-2 of the ceramic capacitors 4B of the power receiving and power supply units 22 and 32 are arranged to be non-perpendicular to in the center axis direction Y2 according to the above-described embodiment, but the invention is not limited thereto. Only one of the power receiving and power supply units 22 and 32 may be configured as above.

In addition, the above-described embodiment is mere a representative mode of the present invention, and the present invention is not limited to the embodiment. That is, various modifications can be made within a scope not departing from a gist of the present invention.

REFERENCE SIGNS LIST 1 power supply system
4B ceramic capacitor (part, capacitor)
4B-2 electrode (metal surface)
20 power supply device (power supply unit)
22 power supply unit (coil unit)
23 power-supply-side coil (coil)
25 power-supply-side case (case)
30 power receiving device (power receiving unit)
32 power receiving unit (coil unit)
33 power-receiving-side coil (coil)
35 power-receiving-side case (case)
G ground surface
V vehicle
Y2 center axis direction

The invention claimed is:

1. A coil unit comprising:
a coil supplying or receiving power in a non-contact manner;
a plurality of capacitors which is provided with an electrode being a metal surface;
a case housing the coil and the capacitors; and
a substrate mounted with the capacitors,
wherein each of the capacitors is arranged such that the metal surface is perpendicular to the substrate and the metal surface is non-perpendicular to a center axis direction of the coil,
wherein the plurality of the capacitors is arranged side by side along the center axis direction of the coil,
wherein the capacitor is arranged such that the metal surface of the capacitor is inclined with respect to the center axis direction of the coil, such that a first end of the metal surface closer to a center of the coil in the center axis direction is located more distant from the center axis of the coil of the coil compared to a second end of the metal surface located opposite to the first end, and
wherein, out of the plurality of capacitors arranged side by side along the center axis direction of the coil, the capacitor located closer to the center of the center axis of the coil has the metal surface with smaller inclination with respect to the center axis of the coil compared to other capacitors.

2. A power supply system comprising:
a power supply unit which is provided on a ground surface; and
a power receiving unit which is provided in a vehicle,
the power receiving unit receiving power transmitted from the power supply unit in a non-contact manner,
wherein at least one of the power supply unit or the power receiving unit includes the coil unit according to any one of claim 1.

* * * * *